United States Patent
Ebert et al.

[15] 3,659,965
[45] May 2, 1972

[54] FUEL PUMP MOUNTING ARRANGEMENT

[72] Inventors: Jurgen Ebert, Gerlingen; Hermann Nusser, Asperg, both of Germany

[73] Assignee: Robert Bosch GmbH, Stuttgart, Germany

[22] Filed: Aug. 17, 1970

[21] Appl. No.: 64,370

[30] Foreign Application Priority Data

Sept. 19, 1969 Germany ..................P 19 47 505.9

[52] U.S. Cl. ..............................417/363, 417/424, 222/385
[51] Int. Cl. ................F04b 17/00, F04b 35/00, F04b 35/04, B67d 5/42
[58] Field of Search ..................417/360, 363, 424; 415/201; 222/333, 385

[56] References Cited

UNITED STATES PATENTS

| 2,819,680 | 1/1958 | Snyder | 417/363 X |
| 2,880,740 | 4/1959 | Peglow | 419/363 X |
| 2,205,831 | 6/1940 | Hartman | 417/363 X |

Primary Examiner—Robert M. Walker
Attorney—Michael S. Striker

[57] ABSTRACT

An electrically operable fuel pump is accommodated in the interior of a fuel tank so as to be at least partly immersed in fuel fluid contained in the tank. The bottom wall of the tank is provided with an opening through which the outlet of the pump communicates with the exterior of the tank and a spring arrangement is located in this opening and mounts the pump on the bottom wall over the opening with freedom of displacement relative to the tank so as to preclude or at least reduce the transmission of vibratory motions between the tank and the pump. A diaphragm seals the opening with reference to the exterior of the tank and at the same time acts to limit the displacement of the spring arrangement and thereby of the pump in direction normal to the general plane of the opening.

9 Claims, 2 Drawing Figures

INVENTORS:
Jürgen EBERT
Hermann NUSSER

By
their ATTORNEY

FUEL PUMP MOUNTING ARRANGEMENT

BACKGROUND OF THE INVENTION

The present invention relates generally to a pump mounting arrangement, and more particularly to a fuel pump mounting arrangement.

The present invention will hereafter be described with reference to the mounting of a fuel pump in the fuel tank of a motor vehicle; however, it is to be understood that this is for explanatory purposes primarily and that the invention has a wider range of applicability.

It is already known, for instance from British Pat. No. 940,510, to mount a fuel pump within the fuel tank of a liquid-fueled combustion engine, for instance a combustion engine for driving a motor vehicle. The purpose of so mounting the pump is, of course, to have it at all times completely or at least partly immersed in the liquid fuel which thus serves to cool the pump. In the prior art it is known to provide the bottom wall of the fuel tank with an aperture which is closed by a cover on which latter the fuel pump is rigidly mounted by means of several bolts or the like. O-ring seals are provided for sealing the cover with reference to the bottom wall of the fuel tank.

This construction definitely achieves its intended purpose of utilizing the liquid fuel in the tank to cool the pump. However, it has been found that the prior-art construction suffers from a disadvantage which under certain circumstances may be highly objectionable, namely the fact that the rigid connection of the pump with the fuel tank via the cover on which the pump is mounted, permits vibrations to be transmitted between the tank and the pump. Thus, vibrations which for instance originate in the pump during the operation of the latter, are directly transmitted to the bottom wall of the fuel tank and then produce objectionable sound effects. In fact, under some circumstances the fuel tank itself may actually act in effect as a sounding board, amplifying the vibrations and consequently the resulting noises to a substantial extent. Conversely it is clear, of course, that any impacts upon the chassis, for instance if the vehicle travels on rough terrain, are transmitted to the fuel tank and from there to the pump, an obviously undesirable circumstance in view of the possibility of damage to the pump.

SUMMARY OF THE INVENTION

It is, accordingly, an object of the present invention to provide an improved arrangement of the type under discussion.

More particularly it is an object of the present invention to provide a pump mounting arrangement which is not possessed of the aforementioned disadvantages.

A concomitant object of the present invention is to provide such a pump mounting arrangement which is quite simple in its construction but highly effective.

A still further object of the invention is to provide such a pump mounting arrangement which not only serves to dampen vibrations and noise originating as a result of such vibrations, but also can act as a pressure-equalizing device.

In pursuance of the above objects, and others will become apparent hereafter, one feature of the invention recites, in an arrangement of the character described, briefly stated, in wall means defining an enclosed compartment adapted to contain a fluid and an electrically operable pump accommodated in such compartment and at least partly immersed in said fluid. Inlet means is provided on the pump for admitting fluid to the latter, and outlet means is provided for pumped fluid communicating with the pump as well as with the exterior of the enclosed compartment. In accordance with the present invention we provide vibration-damping mounting means which mounts the pump on the wall means in a sense at least reducing the transmission of vibrations between the two, that is between the pump and the wall means.

Evidently, it is immaterial where the vibrations originate, that is whether in the pump or in the wall means, because the transmission of such vibrations from one to the other is intended to be—and will be—dampened by the invention. Furthermore, the present invention assures that any impacts or blows upon the chassis and which are transmitted to the fuel tank, are transmitted to the pump only at substantially reduced strength whereby the danger of damage to to the pump is significantly reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
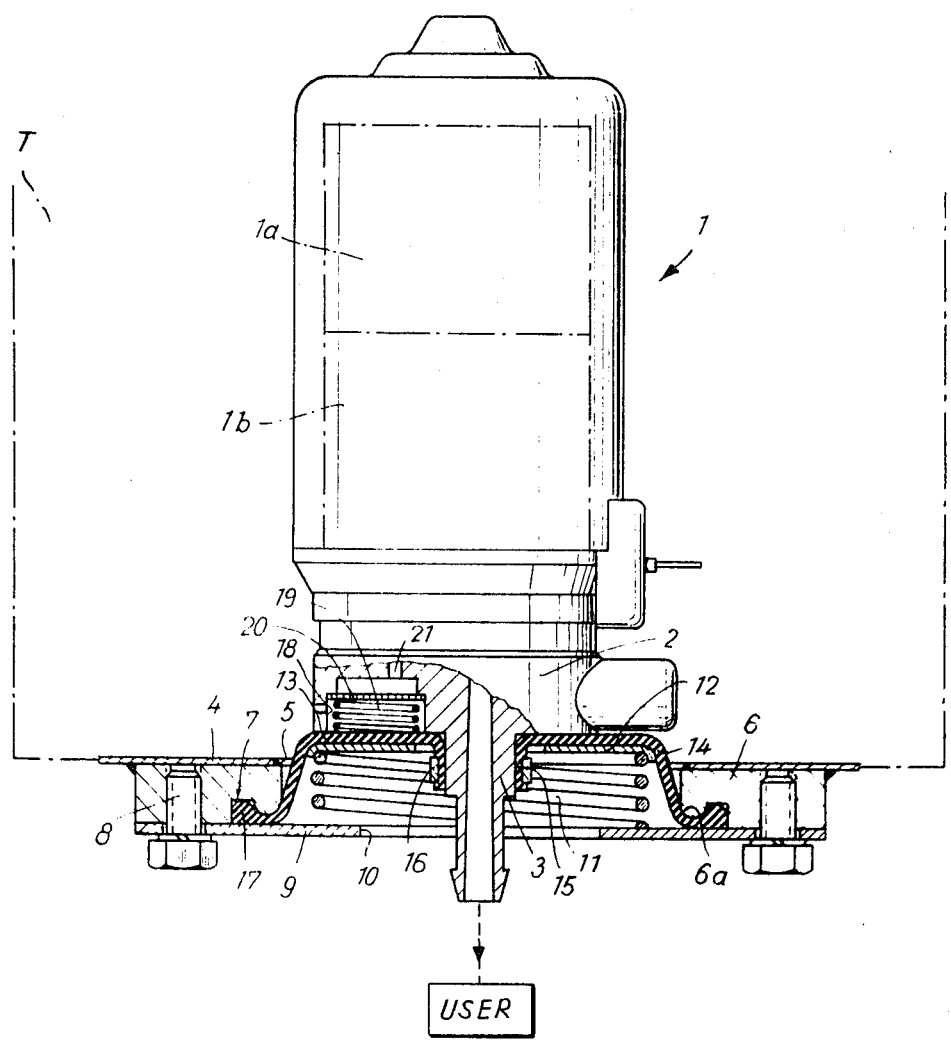
FIG. 1 is a somewhat diagrammatic, partly sectioned and partly broken-away elevational view illustrating one embodiment of the invention.

Discussing now firstly the embodiment illustrated in FIG. 1 it will be seen that reference numeral 1 is utilized to designate in toto a pumping unit composed, as is indicated by the chain line illustration, of an electromotor 1a and a pump unit 1b driven by the electromotor, with both of them being located in a common housing which has not been given a separate reference numeral. Details of the construction of the electromotor 1a and of the pump 1b are not necessary because many different units suitable for this purpose are well known in the art.

The lower end of the pump unit 1—to whose electromotor 1a electricity is of course supplied in suitable manner which also forms no part of the present invention— is configured as a mounting socket 2 which in FIG. 1 is provided with a downwardly projecting outlet nipple 3 communicating with the pressure side of the bump and constituting a part of the pump outlet conduit through which the pump ejects fluid from the interior of the tank T towards the diagrammatically illustrated user.

Reference numeral 4 identifies a bottom wall portion of a fuel tank T the remainder of which is suggested in strictly diagrammatic form by chain lines. It is clear from an inspection of FIG. 1 that the pump unit 1 is located in the interior of the tank T, and it is also evident that the bottom wall portion 4 is provided with a circular cutout 5 the circumference of which is reinforced by a flange 6 of annular configuration which is welded, hard-soldered or otherwise secured to the bottom wall portion 4. Adjacent its inner circumference the flange 6, which may actually be considered a part of the bottom wall portion 4 for all intents and purposes, is provided with an annular circumferential groove 7 and a cover 9 overlies the groove 7 and a portion of the opening 5. The cover 9 has a center opening 10, usually of circular outline, which registers with the opening 5 and it is secured to the flange 6 by means of a plurality of screws 8 or similar suitable securing devices. On the inner side of the cover 10, that is the side facing the interior of the tank T, there is provided a spring which in the illustrated embodiment is in form of a helical expansion spring 11 which bears with one end against the cover 9 concentric with the opening 10 therein. A bearing plate 12 of annular configuration overlies the opposite end of the spring 11, and the spring 11 and bearing plate 12 are straddled by a cup-shaped diaphragm 14 of an elastomeric material. The exact configuration and dimensions of the bearing plate 12 are determined in effect by the outline of the transverse wall portion 13 of the diaphragm 14 because the bearing plate 12 abuts and bears against this transverse wall portion 13 in fitting relationship, as illustrated.

The pump unit 1 is supported on the transverse wall portion 13 of the diaphragm 14, and of course in the final analysis it is supported on the spring 11. The axis of rotation of the electromotor 1a (which axis is not illustrated) is normal to the plane of the opening 5. The center of the transverse wall portion 13 is provided with an opening bounded by a tubular projection 15 which receives within it the nipple 3, that is the portion of the socket 2 which secures the pump to the diaphgram 14. The nipple 3 is retained in the projection 15 by a hose clamp 16 or other suitable means.

The outer periphery of the cup-shaped diaphragm 14 is provided with a thickened bead 17 which is accommodated in the groove 7 and is retained therein against removal by the presence of the cover 9. To prevent cutting or otherwise damaging of the diaphragm 14 by the inner edge of the annular flange 6, this inner edge is convexly rounded as indicated at reference numeral 6a.

The socket 2 of the pump unit 1 is provided with a recess 18 open to the transverse wall of the diaphragm 14, and located in this recess is a filter 20 whose particular construction is of no importance to the present invention. The filter 20 is retained in position in this recess 18 by a spring 19 which bears against it and against the transverse portion 13. At the other side of the filter 20, that is the side which faces away from the spring 19, an inlet bore 21 is shown communicating with the recess 18 and leading to the pump unit 1b. Of course, the recess 18 communicates with the interior of the tank T via a suitable inlet at that side of the filter 20 which faces the spring 19, and such an inlet is diagrammatically illustrated although it will be realized that it need not be located in the position which has been shown for exemplary purposes only.

With the construction according to the present invention, with which the pump unit 1 will always be either completely or at least partially immersed in the non-illustrated liquid fuel contained in the tank T, any vibrations originating during operation of the pump unit 1 will either not be transmitted to the bottom wall portion 4 of the tank T at all, or only transmitted in a condition in which they are so strongly dampened that they cannot produce objectionable noises. Conversely, any blows transmitted from the chassis to the tank T can be transmitted to the pump unit 1 only in strongly reduced force, because the pump unit 1 can move in all directions. Of course, axial spring action of the spring 11, and thereby axial movement of the pump 1 in direction substantially normal to the plane of the opening 5 and of the bottom wall portion 4, is limited by the presence of the diaphragm 14.

Figure 2:
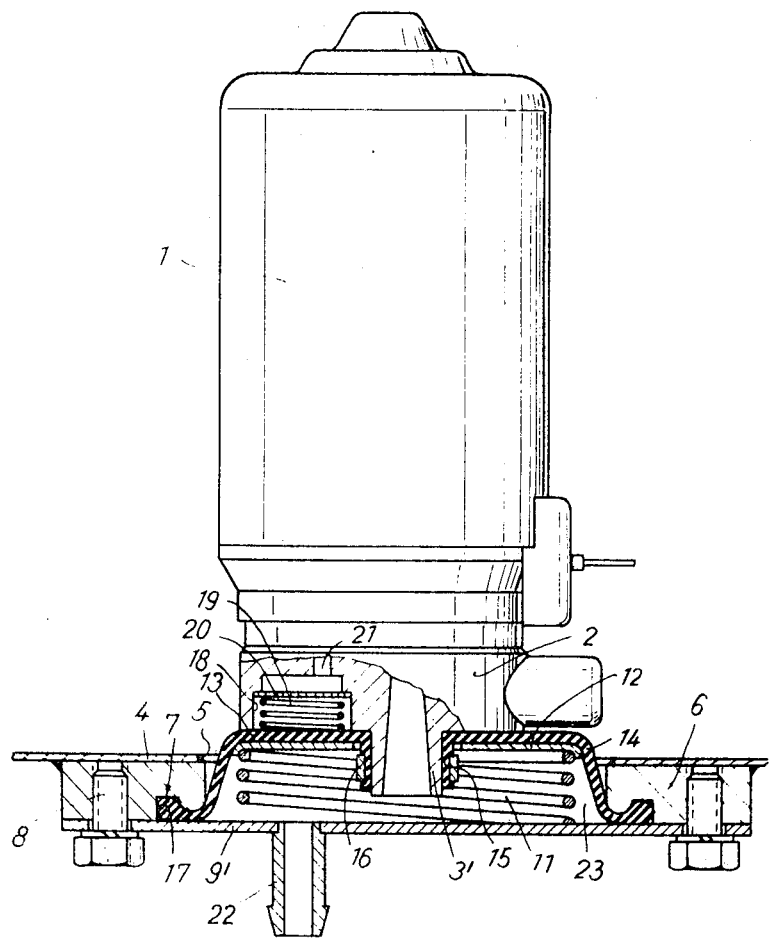
FIG. 2 is a view similar to FIG. 1 but illustrating an additional embodiment of the invention.

The embodiment of FIG. 2 is substantially the same as that of FIG. 1 and like reference numerals identify like elements. It differs from the embodiment in FIG. 1 in that the annular cover 9 of that Figure has been replaced in the embodiment of FIG. 2 with a disc-shaped cover 9' provided with an outlet nipple 22. the cover 9', which of course sealingly engages the bead 17 of the diaphragm 14 just as did the annular cover 9 of FIG. 1, defines with the interior of the cup-shaped membrane an enclosed space 23 in which the tubular conduit portion 3' of the pump unit 1 terminates. The portion 3' is the equivalent of the portion 3 in FIG. 3 but it will be seen that it terminates in the interior of the space 23 rather than extending through the cover 9'. The different in this embodiment over that of FIG. 1 is, therefore, that the outlet conduit is composed of two discrete portions 3' and 22 of which the latter is provided in the cover 9' itself. By virtue of this construction and the elastically yieldable character of the diaphragm 14, the space 23 constitutes an elastic pressure-equalizing chamber whose volume can vary within certain limits in dependence upon elastic yielding of the diaphragm 14. Thus, this space 23 is a pressure-equalizing chamber which reduces and equalizes pressure fluctuations occurring during the operation of the pump unit. The pressure cushion which develops in the space 23 also has the additional purpose of reinforcing the elastic supporting action of the spring 11.

It will be appreciated that, although in both illustrated embodiments the diaphragm 14 has been shown as being cup-shaped, it is not necessary that the diaphragm have such a configuration. It is, for instance, conceivable for the diaphragm to be of planar configuration and to produce—for instance by a different configuration of the flange 6 or by the provision of a cup-shaped space directly on the bottom wall portion 4 of the tank T, or by a different means—a chamber or space is provided having at least one elastic wall portion against which the spring 11 can bear with one of its ends. It will also be appreciated that the spring 11 could be replaced with different spring-biassing means, for instance suitably configurated or arranged dished springs, a rubber or elastomeric spring or the like. This in no way reduces the scope of the inventive concept.

The advantage of the construction in FIG. 2 will of course be self-evident, but merely for purposes of clarification it is pointed out that with the pressure-equalizing chamber 23 any pressure fluctuations originating in the pump unit 1 are mitigated and equalized rather than being directly transmitted into the fuel conduit leading to the user, for instance to the carburetor of a combustion engine.

It will be understood that each of the elements described above, or two or more together, may also find a useful application in other types of constructions differing from the types described above.

While the invention has been illustrated and described as embodied in a fuel pump mounting arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement of the character described, comprising wall means defining an enclosed compartment adapted to contain a fluid and having a bottom wall portion provided with an opening which communicates with the exterior of said compartment, and with an annular groove surrounding said opening; pump means accommodated in said compartment at least partly immersed in said fluid; inlet means on said pump means for admitting fluid to the latter, and outlet means for pumped fluid communicating with said pump means and extending through said opening; vibration-damping mounting means mounting said pump means on said bottom wall portion in a sense at least reducing the transmission of vibrations between them, including spring means, and a diaphragm interposed between said pump means and said spring means and having a circumferential marginal portion provided with a thickened bead sealingly received in said annular groove; and cover means overlying said groove and at least a portion of said opening and maintaining said bead in the former.

2. An arrangement as defined in claim 1, said spring means being a helical spring coaxial with said opening within the confines of the same and having opposite ends which respectively bear on said cover means and, via said diaphragm, on said pump means; and a bearing plate interposed between said spring and said diaphragm.

3. An arrangement of the character described, comprising wall means defining an enclosed compartment adapted to contain a fluid and having a bottom wall portion provided with an opening which communicates with the exterior of said compartment, and with an annular groove surrounding said opening; pump means accommodated in said compartment at least partly immersed in said fluid; inlet means on said pump means for admitting fluid to the latter, and outlet means for pumped fluid communicating with said pump means and extending through said opening; vibration-damping mounting means mounting said pump means on said bottom wall portion in a sense at least reducing the transmission of vibrations between them, including spring means, and a cup-shaped diaphragm straddling said spring means and having a transverse wall portion facing the interior of said compartment, an open side opposite said transverse wall portion, and an aperture in said transverse wall portion bounded by a tubular wall portion projecting towards said open side, said pump means including at least one pump portion fast with said pump means and extending into said tubular wall portion; and retaining means retaining said pump portion in said tubular wall portion.

4. An arrangement as defined in claim 3, wherein said outlet means comprises an outlet conduit, and wherein said pump portion is at least a part of said outlet conduit.

5. An arrangement as defined in claim 3; further comprising a cover sealingly overlying said open side and said opening and defining with the interior of said cup-shaped diaphragm an elastic pressure-equalizing chamber, said spring means being accommodated in said chamber; and wherein said outlet means comprises an outlet conduit including said pump portion which communicates with the interior of said chamber, and a discharge portion provided on said cover and communicating with the interior of said chamber as well as with the exterior of the latter and of said compartment.

6. An arrangement of the character described, comprising wall means defining an enclosed compartment adapted to contain a fluid and having a wall portion provided with an opening; a diaphragm sealingly extending across said opening; spring means engaging said diaphragm exteriorly of said compartment for limiting displacement of said diaphragm in directions intersecting the plane of said opening; an electrically operable pump accommodated in said compartment at least partly immersed in said fluid and mounted on said diaphragm so that the transmission of vibrations between said pump and said wall portion is at least reduced; and inlet means on said pump for admitting fluid to the latter, and outlet means for pumped fluid communicating with said pump and with the exterior of said enclosed compartment.

7. An arrangement as defined in claim 6, said enclosed compartment being the fuel tank for a liquid-fuel engine, and said wall portion being a bottom wall portion.

8. An arrangement as defined in claim 7, said outlet means extending through said opening.

9. An arrangement as defined in claim 6, said spring means comprising a helical spring coaxial with said opening and bearing on said diaphragm.

* * * * *